United States Patent
Hendrickson et al.

(10) Patent No.: US 8,860,777 B2
(45) Date of Patent: Oct. 14, 2014

(54) MULTI-ENTERPRISE VIDEO CONFERENCE SERVICE

(75) Inventors: Heath W. Hendrickson, McKinney, TX (US); Jeffrey Haltom, Fishers, IN (US); Jeffrey J. Reger, Peyton, CO (US); Mark E. Stallcup, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 378 days.

(21) Appl. No.: 13/334,446

(22) Filed: Dec. 22, 2011

(65) Prior Publication Data

US 2013/0162753 A1  Jun. 27, 2013

(51) Int. Cl.
*H04N 7/14* (2006.01)

(52) U.S. Cl.
USPC ......... 348/14.08; 348/14.07; 348/14.09; 348/211.12; 370/260; 370/261; 379/88.11; 379/202.01; 455/519; 709/204; 709/227; 715/759

(58) Field of Classification Search
CPC .......... H04N 7/15; H04N 7/152; G06F 21/10; H04M 3/567
USPC ............. 348/14.07, 14.08, 14.09, 211.12; 370/261, 260; 455/519; 709/204, 227; 379/88.11, 202.01; 715/759
See application file for complete search history.

(56) References Cited

U.S. PATENT DOCUMENTS

| | | | | |
|---|---|---|---|---|
| 5,598,209 A | * | 1/1997 | Cortjens et al. | 348/211.12 |
| 5,619,555 A | * | 4/1997 | Fenton et al. | 379/88.11 |
| 5,745,161 A | * | 4/1998 | Ito | 348/14.09 |
| 5,745,711 A | * | 4/1998 | Kitahara et al. | 715/759 |
| 6,466,252 B1 | * | 10/2002 | Miyazaki | 370/260 |
| 6,876,734 B1 | * | 4/2005 | Summers et al. | 379/202.01 |
| 7,046,779 B2 | * | 5/2006 | Hesse | 379/202.01 |
| 7,353,251 B1 | * | 4/2008 | Balakrishnan | 709/204 |
| 7,716,283 B2 | * | 5/2010 | Thukral | 709/204 |
| 7,747,270 B2 | * | 6/2010 | Schwagmann et al. | 455/519 |
| 8,064,368 B1 | * | 11/2011 | Jones et al. | 370/260 |
| 8,200,756 B2 | * | 6/2012 | Karniely | 709/204 |
| 8,411,129 B2 | * | 4/2013 | Satterlee et al. | 348/14.08 |
| 8,471,889 B1 | * | 6/2013 | Lee et al. | 348/14.07 |
| 8,736,661 B2 | * | 5/2014 | Koh et al. | 348/14.08 |
| 2004/0119814 A1 | * | 6/2004 | Clisham et al. | 348/14.08 |
| 2009/0147705 A1 | * | 6/2009 | Kowalewski | 370/261 |
| 2013/0127979 A1 | * | 5/2013 | Koh et al. | 348/14.08 |
| 2013/0162753 A1 | * | 6/2013 | Hendrickson et al. | 348/14.08 |

OTHER PUBLICATIONS

Cisco Systems, Inc., "Cisco TelePresence MCU 4500 Series MSE 8510 Media blade", Online Help, Software Version 4.1, Oct. 2010, 238 pages.

(Continued)

*Primary Examiner* — Gerald Gauthier

(57) ABSTRACT

A system is configured to receive a request to set up a first video conference and another request to set up a second video conference, where the request is received from a client device and where the other request is received from another client device; obtain first information associated with an enterprise with which the client device is associated and second information associated with another, different enterprise with which the other client device is associated; determine whether the first information permits the client device to set up the first video conference and whether the second information permits the other client device to set up the second video conference; establish the first video conference when the first information permits the client device to set up the first video conference; and establish the second video conference when the second information permits the other client device to set up the second video conference.

24 Claims, 9 Drawing Sheets

(56) References Cited

OTHER PUBLICATIONS

Tandberg Products UK Ltd., "Tandberg Codian Supervisor help contents", 2003-2010, 75 pages.
Tandberg, "Knowledge Base", 2010, retrieved from internet archive, Feb. 27, 2010, 2 pages.
Tandberg, "Know Base Article 67—Which SNMP MIBs do codian products support?", retrieved from internet archive Aug. 25, 2010, 2 pages.
Tandberg, "Knowledge Base Article 114—What are the SMNP System OIDs for TANDBERG Codian products?", retrieved from internet archive Aug. 25, 2010, 1 page.
Tandberg, "Online Support", retrieved from internet archive, Oct. 27, 2010, 1 page.
Tandberg, "Tandberg Video Communication Server Control Application", Feb. 2009, 2 pages.
Tandberg, "Tandberg Video Communication Server Expressway Application", Mar. 2008, 2 pages.
Tandberg, "Tandberg Management Suite", Jul. 2004, 2 pages.
Tandberg, "Tandberg Codian MSE 8000 Series", Oct. 2004, 2 pages.
Cisco Systems, Inc., "Cisco Telepresence System Codec C-Series", Software release notes TC4, Feb. 2011, 53 pages.
Tandberg, "Tandberg Codian MSE 8050 Supervisor", Version 2.1(1.18) Software release notes, Jul. 2010, 7 pages.
Tandberg, "Tandberg Codian: MCU 4200 Series; MCU 4500 Series; MSE 8420 Media blade; MSE 8510 Media2 blade", Version 4.1(1.51), Software release notes, Sep. 2010, 16 pages.
Cisco Systems, Inc., "Total TelePresence" Version 4.0.0, Release notes, Nov. 2010, 3 pages.
Cisco Systems, Inc., "Cisco TelePresence Server—Cisco TelePresence Server MSE 8710; Cisco TelePresence Server 7010", Version 2.2(1.43), Software Release notes, Aug. 2011, 21 pages.
Cisco Systems, Inc., "Cisco TMS Provisioning Deployment Guide", Jan. 2011, 47 pages.
Cisco Systems, Inc., "Cisco TelePresence Video Communication Server (Cisco VCS) IP port usage for firewall traversal", Sep. 2011, 28 pages.
Tandberg, "Tandberg H.323", Mar. 2010, 119 pages.
Cisco Systems, Inc., "Cluster creation and maintenance—Cisco TelePresence Deployment Guide", Cisco VCS X5, Oct. 2010, 72 pages.
Cisco Systems, Inc., "Cisco TelePresence—TelePresence Server 8710 and 7010", Version 2.2, Product user guide, Jun. 2011, 151 pages.
Cisco Systems, Inc., "Basic Cisco VCS configuration TelePresence Deployment Guide", Cisco VCS Control with Cisco VCS Expressway X5.2, Nov. 2010, 44 pages.
Cisco Systems, Inc., "Cisco TelePresence Video Communication Server X6.1" Software release notes, Apr. 2011, 26 pages.
Cisco Systems, Inc., "Cisco TelePresence Video Communication Server—Getting Started", Dec. 2010, 12 pages.
Cisco Systems, Inc., "Cluster Creation and Maintenance—Cisco TelePresence Deployment Guide", Cisco VCS X6.1, May 2011, 68 pages.
Cisco Systems, Inc., "Cisco Unified Communication Manager", Versions v6.1, 7 and 8, Cisco TelePresence Deployment Guide, Cisco VCS X6, SIP trunk, Jun. 2011, 49 pages.
Cisco Systems, Inc., "Authenticating Devices—Cisco TelePresence Deployment Guide", Cisco VCS X6.1, May 2011, 24 pages.
Cisco Systems, Inc., "Cisco TelePresence Video Communication Server Administrator Guide", Software Version X6.1, Apr. 2011, 401 pages.
Cisco Systems, Inc., "Cisco TelePresence Management Suite" Release note, Jan. 2011, 25 pages.
Cisco Systems, Inc., "Cisco TelePresence Management Suite Installation and Getting Started guide", Jan. 2011, 69 pages.
Cisco Systems, Inc., "Cisco TelePresence Management Suite Administration Guide", Dec. 2010, 37 pages.

\* cited by examiner

| ENTERPRISE 410 | CLIENT SERVER ID 415 | CLIENT EQUIPMENT ID 420 | USER INFO 425 | PRIVILEGE LEVEL 430 | TYPE 435 | ACCESS 440 |
|---|---|---|---|---|---|---|
| A | 120-1 | CE1 | USER1 | HIGH | INTERNAL | YES |
| A | - | CE2 | USER2 | STANDARD | EXTERNAL | YES |
| PARTNER B | 120-M | CE3 | USER3 | STANDARD | EXTERNAL | YES |
| ... | ... | ... | ... | ... | ... | ... |
| A | 120-1 | CE4 | MDN3 | NONE | INTERNAL | NO |
| PARTNER B | - | CE5 | LDN4 | NONE | EXTERNAL | NO |

442 → row 1
444 → row 2
446 → row 3
448 → row 5
450 → row 6

FIG. 4

MULTI-ENTERPRISE VIDEO CONFERENCE SERVICE

BACKGROUND

Users, of user devices, have a growing array of networks and/or service providers from which to obtain video conferencing services. The user devices may be associated with an enterprise, such as a business, an organization, etc., that subscribes to the video conference services so that the user devices can access and utilize the video conference services. The user devices usually access the video conferencing service by calling a telephone number, utilizing a string, and/or accessing a website, and providing login credentials. When the login credentials are verified, the user devices are connected to a communication bridge via which the video conference services can be accessed by the user devices. The video conferencing services may allow users, of the user devices, to interact, on a real-time basis, with other users in a virtual multi-media environment associated with streaming voice, video, messaging, etc.

Unfortunately, the video conferencing services may allow users, that have acquired the login credentials and which are not authorized to attend the video conference, to access the video conference service. Allowing unauthorized users to access the video conference may permit confidential information associated with the enterprise to be disclosed to the unauthorized users.

BRIEF DESCRIPTION OF THE DRAWINGS

FIG. 4 is a diagram of an example data structure that stores client information associated with an enterprise;

DETAILED DESCRIPTION OF PREFERRED EMBODIMENTS

The following detailed description refers to the accompanying drawings. The same reference numbers in different drawings may identify the same or similar elements.

A system and/or method, described herein, may allow a video communication and/or conference system (VCCS), originally designed to enable a client device associated with an enterprise to hold video conferences, to set up and/or establish multiple distinct virtual environments that can be accessed by client devices associated with multiple different enterprises. Each distinct virtual environment may allow users, of respective client devices, to interact in a secure manner and/or from potentially geographically distributed locations. The VCCS may establish each of the virtual environments using public access points and/or connections (e.g., using a non-secure, generic, and/or publically accessible protocol, etc.), secure access points and/or connections (e.g., using a secure protocol, such as a tunneling protocol, a virtual private network (VPN), etc.), based on respective client information that specifies access control, call routing, communication and/or security protocols, etc. for each of the virtual environments. The VCCS may segregate virtual environments so that information, from within one virtual environment, cannot be access via another virtual environment. Establishing multiple virtual environments may enable the VCCS to provision a video conferencing service to multiple different enterprises, which may allow users, of the client devices, to communicate via a video conference while avoiding the expense associated with traveling to meetings.

A system and/or method may allow the VCCS to dynamically determine whether to permit a client device to access a virtual environment based on client information. The VCCS may, based on the client information, block a user from setting up a virtual environment that provides access to a user that is not authorized, by the client information, to access the virtual environment. A system and/or method may allow the VCCS to dynamically set up a virtual environment, on a near real-time basis, if the client information permits the user to set up the virtual environment.

Figure 1:
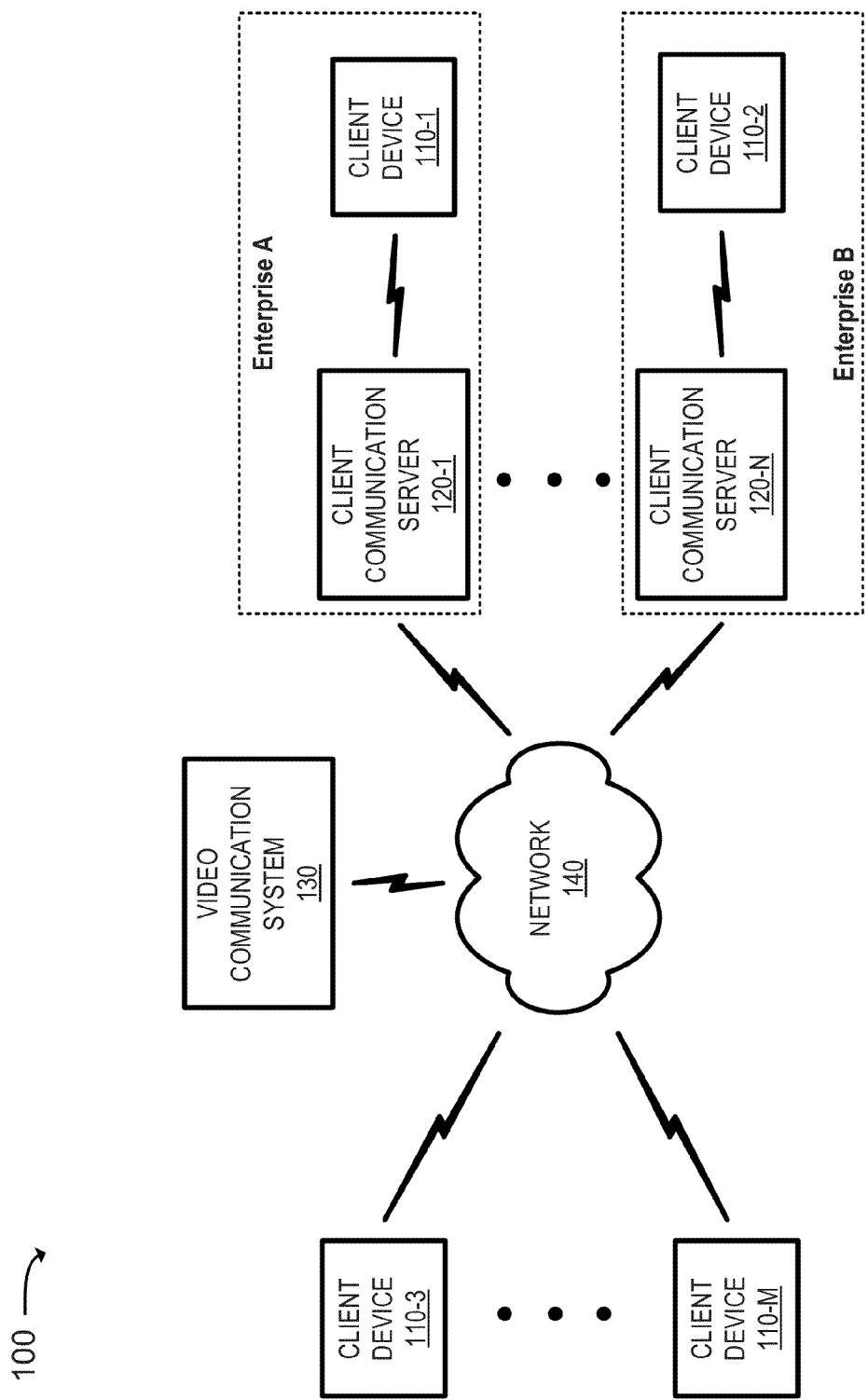
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of client devices 110-1, . . . , 110-M (where M≥1), a group of client communication servers 120-1, . . . , 120-N (where N≥1) (hereinafter referred to collectively as "client servers 120" and individually as "client server 120"), a video communication and/or conference system (VCCS) 130, and a network 140. The number of systems, equipment, or servers, illustrated in FIG. 1, is provided for explanatory purposes only. In practice, there may be additional systems, equipment, or servers; fewer systems, equipment, or servers; different systems, equipment, or servers; and/or differently arranged systems, equipment, or servers than illustrated in FIG. 1.

Also, in some implementations, one or more of the devices and/or servers of environment 100 may perform one or more functions described as being performed by another one or more of the devices and/or servers of environment 100. Devices of environment 100 may interconnect via wired connections, wireless connections, or a combination of wired and wireless connections.

Client device 110 may include one or more devices that is capable of communicating with network 140. For example, client device 110 may include a desktop computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, a smart phone, or another type of computation and/or communication device.

Client device 110 may, for example, use a camera to take a picture and/or record video that client device 110 can transmit, as an image and/or video content, respectively, to VCCS 130 via network 140 and/or client server 120. Client device 110 may also, or alternatively, include a microphone that is capable of recording sound, such as words spoken by a user of client device 110, that client device 110 can transmit, as audio content, to VCCS 130 via network 140 and/or client server 120. Client device 110 may transmit, to VCCS 130, a media stream of traffic that includes the image, the video content, the audio content, and/or other content (e.g., message content, data, etc.).

Client device 110-1 may be associated with an enterprise (e.g., shown as a dotted rectangle labeled as "Enterprise A") and may communicate with other client devices (not shown in FIG. 1), associated with the enterprise, via client communication server 120-1 associated with the enterprise. The enterprise may be associated with a first private network (e.g., a local area network (LAN), a wide area network (WAN), etc.) located, for example, within an office where the enterprise conducts business. Client device 110-1 and/or client communication server 120-1 may be connected to the first private network. Assume that client device 110-3 is also associated with the enterprise and is not directly connected to the first private network.

Client device 110-2 may be associated with another enterprise (e.g., shown as a dotted rectangle labeled as "Enterprise B") and may communicate with other client devices (not shown in FIG. 1), associated with the other enterprise, via client communication server 120-N associated with the other enterprise. The other enterprise may be associated with a second private network located, for example, within an office where the other enterprise conducts business. Client device 110-2 and/or client communication server 120-N may be connected to the second private network. Assume that client device 110-M is also associated with the other enterprise and is not directly connected to the second private network.

Client server 120 may include one or more server devices, or other types of computation and/or communication devices, that gather, process, search, store, and/or provide information in a manner described herein. In one example, client server 120 may receive, process, and/or transmit traffic, such as voice, video, text, and/or other data associated with a virtual environment set up by a user of client device 110. Client server 120 may maintain an authorized client list (e.g., a white list) of client devices 110 and/or users of client devices 110 that are permitted, by an operator of client server 120, to access and/or utilize a video conference service that is provisioned by VCCS 130. Client server 120 may also, or alternatively, maintain an unauthorized client list (e.g., black list) of other client devices 110 and/or users of the other client devices 110 that are not permitted, by the operator, to access the video conference service. Client server 120 may transmit the authorized client list and/or the unauthorized client list to VCCS 130. Client server 120 may transmit, to VCCS 130, an updated authorized and/or unauthorized client list when changes are made to the authorized and/or unauthorized client list, respectively.

VCCS 130 may include one or more devices that gather, process, search, store, and/or provide information in a manner similar to that described herein. VCCS 130 may be capable of communicating with client devices 110 and/or client servers 120 via network 140. VCCS 130 may perform operations associated with setting up, establishing, or terminating one or more virtual environments via which a video conference service is provisioned to client devices 110.

Network 140 may include one or more wired and/or wireless networks. For example, network 140 may include a cellular network, the Public Land Mobile Network (PLMN), a public switched telephone network (PSTN), and/or a second generation (2G) network, a third generation (3G) network, a fourth generation (4G) network, a fifth generation (5G) network, and/or another network (e.g., a long term evolution (LTE) network). Additionally, or alternatively, network 160 may include a wide area network (WAN), a metropolitan area network (MAN), an ad hoc network, an intranet, the Internet, and/or a combination of these or other types of networks.

Figure 2:
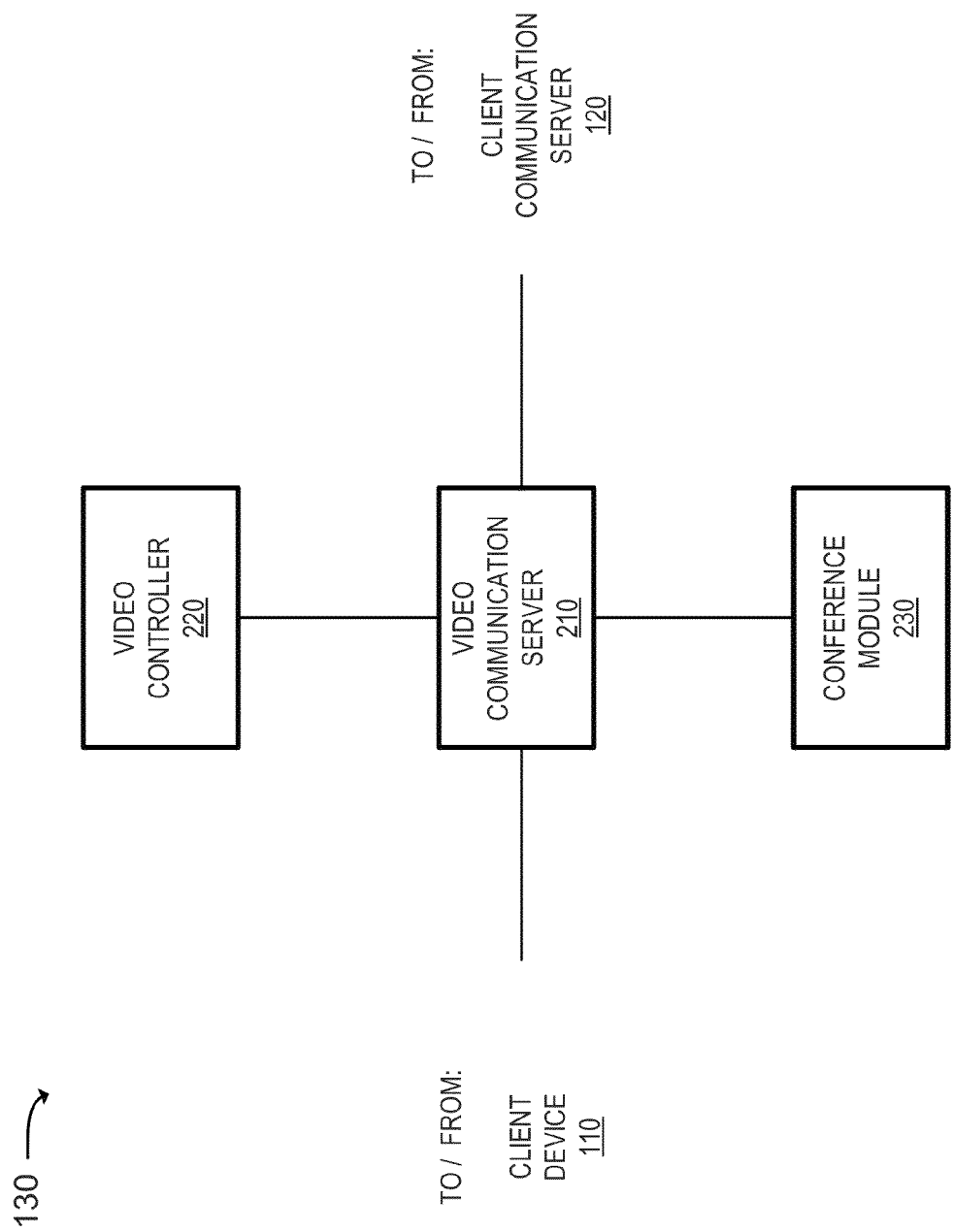
FIG. 2 is a diagram of example components of the video communication system depicted in FIG. 1.

FIG. 2 is a diagram of example components of VCCS 130. VCCS 130 may include a video communication server 210, a video controller 220, and/or a conference module 230. In another implementation, VCCS 130 may include additional components, fewer components, different components, or differently arranged components than are shown in FIG. 2.

Video communication server 210 may include one or more server devices, or other types of computation and/or communication devices, that gather, process, search, store, and/or provide information in a manner described herein. Video communication server 210 may be capable of communicating, via network 140, with client server 120 and/or client device 110. Video communication server 210 may also, or alternatively, be capable of communicating with video controller 220 and/or conference module 230.

In one example, video communication server 210 may receive, process, and/or transmit traffic, such as voice, video, text, and/or other data associated with a virtual environment via which a conference (e.g., a video conference, a telephone conference, etc.) is to be set up and/or conducted. Video communication server 210 may also, or alternatively, communicate using a variety of transport and/or signaling protocols (e.g., a streaming protocol, an IP, a telepresence interworking protocol (TIP), etc.) that allow video communication server 210 to communicate with a variety of types of client servers 120 (e.g., Cisco Unified Call Manager (CUCM), etc.) and/or client devices 110 (e.g., Cisco Telepresence System (CTS), etc).

Video communication server 210 may, for example, communicate with client server 120 to obtain client information associated with one or more enterprises (e.g., enterprise A, enterprise B, etc.). The client information, for a particular enterprise, may generally identify which client devices 110 are authorized to access and/or utilize a video conferencing service being provisioned by VCCS 130 and/or which client devices 110 are not authorized to access and/or utilize the video conference service. Video communication server 210 may provide the client information to video controller 220.

Video communication server 210 may also, or alternatively, receive a request, from client device 110, to set up a virtual environment via which to hold a conference. Video communication server 210 may forward the request for processing to video controller 220. Based on an indication, received from video controller 220, that client device 110 is authorized to set up the virtual environment, video communication server 210 may instruct conference module 230 to establish a bridge to which one or more client devices 110 can connect to attend the conference. Additionally, or alternatively, video communication server 210 may receive a request, from another client device 110, to access the conference and may forward a request to video controller 220 to determine whether the other client device 110 is authorized to access the bridge associated with the conference. Video communication server 210 may receive, from video controller 220, an indication that client device 110 is authorized to access the conference and may forward the request to conference module 230 to establish a connection between client 110 and the bridge. Video communication server 210 may not forward the request to conference module 230 based on an indication that the other client device 110 is not authorized to access the conference.

Video controller 220 may include one or more server devices, or other types of computation and/or communication devices, that gather, process, search, store, and/or provide information in a manner described herein. In one example, video controller 220 may be capable of communication with video communication server 210 and/or conference module 230. Video controller 220 may receive, from video communication server 210, client information associated with one or more enterprises (e.g., enterprise A, enterprise B, etc.). Video controller 220 may store the client information in a memory associated with VCCS 130.

Video controller 220 may also, or alternatively, receive, from video communication server 210, set up information associated with a request to set up a conference. The set up information may generally identify which client device 110 is to participate in the conference, a time at which the conference is to occur, etc. Video controller 220 may determine whether a user, of client device 110 from which the request originated, is authorized to set up the conference based on client information associated with an enterprise with which the user is associated. Video controller 220 may transmit, to video communication server 210, an indication of whether client device 110 is authorized to set up the conference.

Video controller 220 may also, or alternatively, determine whether users, of other client devices 110, are authorized to access the conference by determining whether the other client devices 110 are authorized by the set up information and/or is not precluded from accessing the conference by the client information. Video controller 220 may transmit, to video communication server 210, an indication of whether the other client devices 110 are authorized to attend the conference.

Conference module 230 may include one or more devices that are capable of creating a bridge associated with a conference (e.g., a video conference, a telephone conference, etc.), between client devices 110. The bridge may permit multiple client devices 110 to be connected to create a virtual environment in which to conduct a conference where each client device 110 can communicate with other client devices 110 connected to the bridge. Conference module 230 may create the bridge based on set up information received from video communication server 210 and/or video controller 220. Conference module 230 may, allocate resources to allow the bridge to be set up, such as a quantity of ports, associated with the bridge, based on a quantity of client devices 110 identified by the set up information. Conference module 230 may also, or alternatively, schedule a period of time, identified by the set up information, during which resources (e.g., bandwidth, processing and/or switching capacity, etc.) are to be allocated for the bridge. Conference module 230 may receive, from video communication server 210, a request to access the bridge, associated with client device 110, and may connect client device 110 to the bridge. Conference module 230 may provide services associated with the bridge, such as audio and/or video recordings, text transcriptions, etc. Conference module 230 may terminate the conference at a time identified by the set up information, which may cause client device 110 to be disconnected from the bridge.

Figure 3:
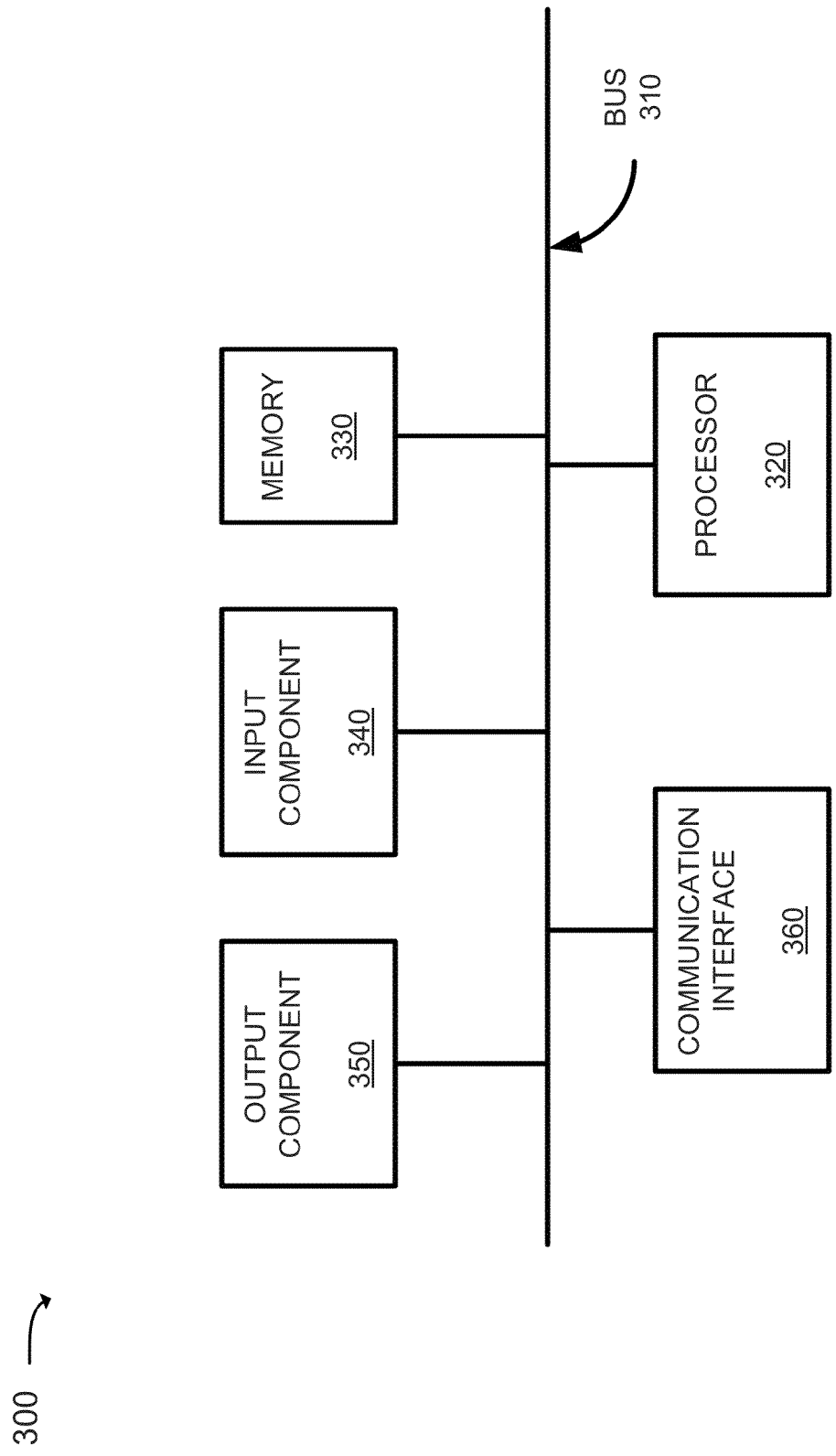
FIG. 3 is a diagram of example components of one or more of the devices depicted in FIGS. 1 and/or 2.

FIG. 3 is a diagram of example components of a device 300 that may correspond to client device 110, client server 120, video communication server 210, video controller 220, and/or conference module 230. Alternatively, each of client device 110, client server 120, video communication server 210, video controller 220, and/or conference module 230 may include one or more devices 300 and/or one or more components of device 300. Device 300 may include a bus 310, a processor 320, a memory 330, an input component 340, an output component 350, and a communication interface 360.

In another implementation, device 300 may include additional components, fewer components, different components, or differently arranged components than are shown in FIG. 3.

Bus 310 may include a path that permits communication among one or more of the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a pointing device, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, or the like.

As will be described in detail below, device 300 may perform certain operations relating to provisioning a video conference service. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 that stores client information associated with an enterprise. Data structure 400 may be stored in a memory associated with client server 120 and/or VCCS 130. Data structure 400 may include a collection of fields, such as, for example, an enterprise field 410, a client server identifier (ID) field 415, a client device ID field 420, a user information (info) field 425, a privilege level field 430, a type field 435, and an access field 440. The quantity of fields, within data structure 400, is provided for explanatory purposes. In another implementation, there may be additional fields, fewer fields, different fields, or differently arranged fields than are shown in FIG. 4.

Enterprise field 410 may store information that identifies an enterprise (e.g., a company name, identifier, etc.) with which a particular client device 110 is associated. Client server ID field 415 may store information associated with client server 120 (e.g., an IP address, a uniform resource locator (URL), a uniform resource identifier (URI), a media access control (MAC) address, etc.) via which the particular client device 110, associated with the enterprise, communicates with video communication server 210. Client device ID field 420 may store information associated with the particular client device 110, such as a device identifier (e.g., a mobile directory number, a landline directory number, etc.), an address (e.g., an IP address, a URL, a URI, a MAC address, etc.), information associated with a type of client device 110 (e.g., a computer, a mobile device, a CTS, etc.), etc. Client device ID field 420 may also, or alternatively, store information associated with a type of encryption that the particular client device 110 is capable of using.

User info field 425 may store information associated with a user of the particular client device 110 (e.g., a name, a home address, a business address, a username, password, personal identification number (PIN), etc.).

Privilege level field 430 may store information that identifies a privilege level associated with the user of the particular client device 110. The privilege level may, for example, identify whether the user is authorized to access a video conference service, being provisioned by VCCS 130, to set up a conference and/or to invite users of other client devices 110, associated with the enterprise, to the conference. Additionally, or alternatively, the privilege level may identify whether the user is authorized to invite users, of other client devices 110, to attend a conference (e.g., a conference set up by the user) that are not associated with the enterprise and/or are associated with a different enterprise.

Type field 435 may store information that identifies whether the user is an internal user associated with the enterprise, an external user associated with the enterprise, or a user that is not associated with the enterprise or is associated with a different enterprise (e.g., a partner of the enterprise, a competitor of the enterprise, etc.). For example, an internal user may be associated with client device 110 that is directly connected to a private network associated with an enterprise and/or with communication server 120 associated with the enterprise. An external user may be associated with client device 110 that communicates indirectly with the private network and/or communication server 120 (e.g., via network 140 and/or another communication server 120 associated with a different enterprise).

Access field 440 may store information that identifies whether the user and/or the particular client device 110 is authorized to attend a conference that is set up by another user of a different client device 110.

For example, an operator, of client server 120, may enter client information, associated an enterprise, into data structure 400 (e.g., via a user interface, retrieved from a memory, obtained from another server device, etc.) that identifies users, of client devices 110, that are authorized to access a video conference service provisioned by VCCS 130. In one example, data structure 400 may store client information that identifies the enterprise (e.g., A), client server 120 associated with the enterprise (e.g., 120-1), and/or information associated with first client device 110 associated with the enterprise (e.g., CE1) (e.g., as shown by ellipse 442). Data structure 400 may also, or alternatively, store information associated with a first user (e.g., user1) of the first client device 110, a privilege level of the first user (e.g., high), and an indication (e.g., internal) that the first client device 110 is connected to a private network (e.g., a LAN, WAN, etc.) associated with the enterprise (e.g., as shown by ellipse 442). Data structure 400 may also, or alternatively, store information that identifies whether first client device 110 is permitted to attend a video conference (e.g., yes) (e.g., as shown by ellipse 442). A high privilege level may indicate that the first user is authorized to invite a user associated with external client device 110 that is not connected to the private network and/or that is associated with another enterprise.

Additionally, or alternatively, data structure 400 may store client information associated with second client device 110 (e.g., CE2) that is associated with the enterprise (e.g., A), but is outside of and/or not connected to (e.g., external) the private network associated with the enterprise (e.g., as shown by ellipse 444). Second client device 110 may also be authorized to access the video conference service (e.g., yes) (e.g., as shown by ellipse 444). Data structure 400 may also, or alternatively, store information that identifies a privilege level (e.g., standard) that permits the second user to set up a conference that internal and/or external client device 110, associated with the enterprise, are permitted to attend, but not external client device 110 that are not associated with the enterprise (e.g., as shown by ellipse 444).

Data structure 400 may also, or alternatively, store client information associated with a third user (e.g., user3), of third client device 110 (e.g., CE3) associated with another enterprise (e.g., partner B), that is authorized to access the video conference service (e.g., yes) (e.g., as shown by ellipse 446). The third user may, for example, correspond to an employee, associated with the other enterprise, that is authorized to work on a project with employees of the enterprise. Third client device 110 may be authorized to access the video conference service, via another client server 120 (e.g., 120-M) associated with the other enterprise, that is external to the private network (e.g., external) (e.g., as shown by ellipse 446).

Data structure 400 may also store client information associated with users (e.g., user4, user5, etc.) and/or client device 110 (e.g., CE4, CE5, etc.) that are not authorized to access the video conference service (e.g., no) and/or have a privilege level that indicates that the users are not authorized to set up a conference (e.g., none) (e.g., as shown by ellipses 448 and 450). The users may be associated with the enterprise (e.g., A) and/or the other enterprise (e.g., partner B) (e.g., as shown by ellipses 448 and 450).

Figure 5:
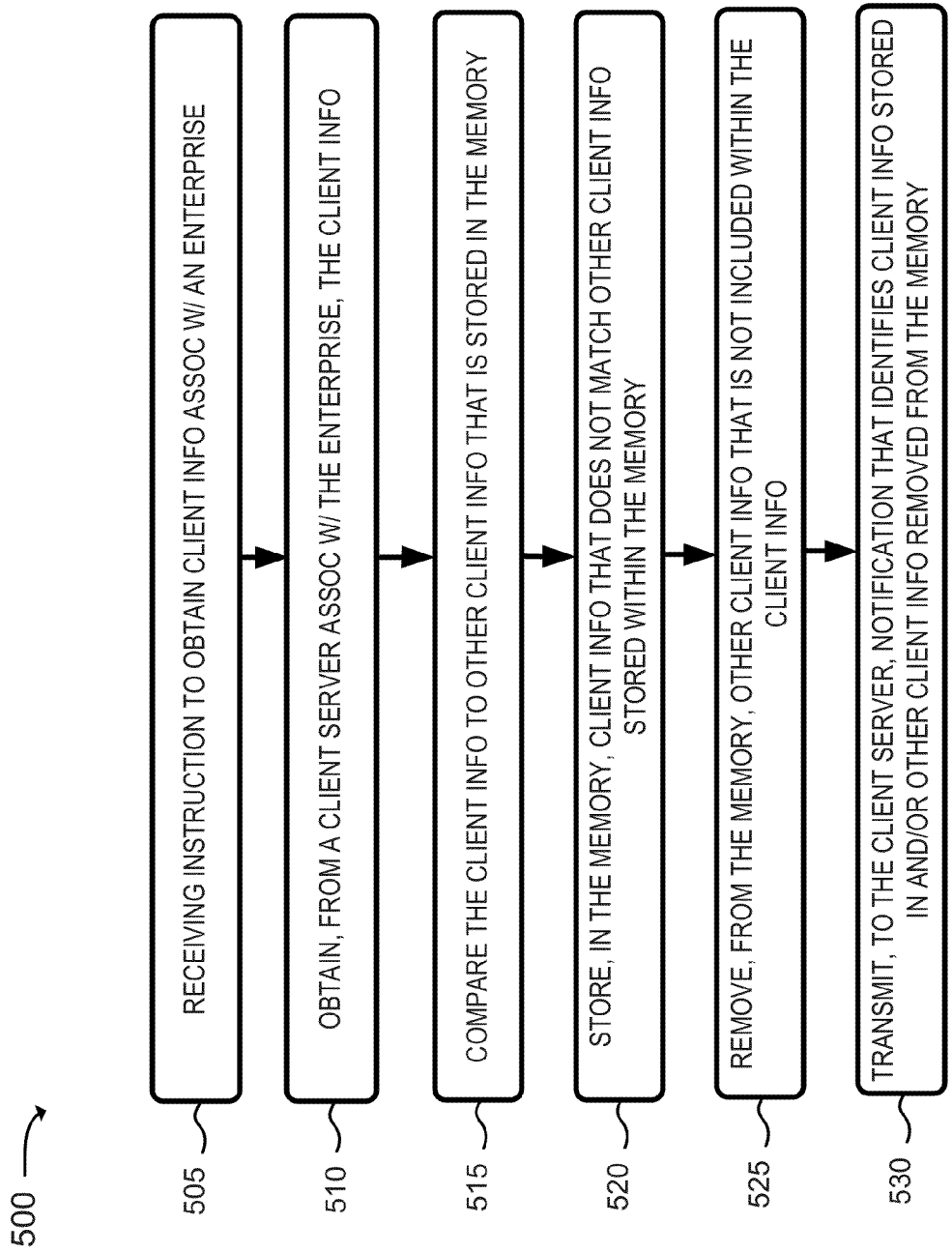
FIG. 5 is a flow chart of an example process for obtaining or updating client information associated with an enterprise, according to an implementation described herein.

FIG. 5 is a flow chart of an example process 500 for obtaining or updating client information associated with an enterprise, according to an implementation described herein. In one implementation, process 500 may be performed by VCCS 130. In another implementation, some or all of process 500 may be performed by a device or collection of devices separate from, or in combination with, VCCS 130.

As shown in FIG. 5, process 500 may include receiving an instruction to obtain client information associated with an enterprise (block 505) and obtaining, from a client server associated with an enterprise, the client information (block 510). For example, VCCS 130 may receive an instruction, from an operator of VCCS 130 and/or based on an occurrence of some event (e.g., based on a predetermined time interval, a time of day, etc.), to obtain client information associated with one or more enterprises that have subscribed to a video conference service provisioned by VCCS 130. VCCS 130 may, as a result of the instruction, transmit, to client server 120 associated with an enterprise, a request for client information associated with the enterprise. Client server 120 may receive the request and may provide the client information to VCCS 130.

In another example, client server 120 may provide, to VCCS 130, the client information without receiving the request from VCCS 130. Client server 120 may, for example, automatically, or in response to an instruction from an operator of client server 120, provide the client information to VCCS 130. In one example, the operator, of client server 120, may enter client information, associated with the enterprise, into a data structure (e.g., data structure 400 of FIG. 4) for the first time and may instruct client server 120 to transmit the client information to VCCS 130. Additionally, or alternatively, client server 120 may access a website hosted by VCCS 130 and/or a database to which VCCS 130 has access. VCCS 130 may obtain the client information via the website (e.g., via web page associated with the website) and/or by accessing the database and retrieving the client information from the database.

The client information may include a respective first entry for each client device 110 that is authorized to use and/or access a video conference service that is provisioned by VCCS 130 and/or a respective second entry for each client device 110 that is not authorized to use and/or access the video conference service. In another example, the operator, of client server 120, may update the client information (e.g., by adding or removing entries from the client information) and may cause client server 120 to transmit, to VCCS 130, the updated client information. VCCS 130 may receive the client information from client server 120.

Process 500 may include comparing the client information to other client information that is stored in the memory (block 515) and storing, in the memory, client information that does not match other client information that is stored within the memory (block 520). For example, VCCS 130 may compare the client information, received from client server 120, to other client information stored within a memory associated with VCCS 130. Based on a determination, that the received client information does not match the other client information, VCCS 130 may store the client information in the memory associated with VCCS 130. In another example, VCCS 130 may determine that one or more entries, associated with one or more client devices 110 and within the received client information, does not match any entries of the other client information. Based on the determination that the one or more entries do not match any of the entries of the other client information, VCCS 130 may associate, within the memory, the one or more entries with the other client information.

Process 500 may include removing, from the memory, other client information that is not included within the client information (block 525) and may transmit, to the client server, a notification that identifies client information stored and/or other client information removed from the memory (block 530). For example, VCCS 130 may determine that one or more entries, within the other client information associated with the enterprise and stored within the memory, does not match any entries of the received client information. Based on the determination that the one or more entries, within the other client information, does not match any of the entries of the received client information, VCCS 130 may erase, overwrite and/or otherwise remove, from the memory, the one or more entries that do not match any of the entries associated with the received client information.

VCCS 130 may transmit a notification, to client server 120, that indicates that the client information has been stored within the memory. The notification may identify the one or more entries that were associated, within the memory, with the other client information. Additionally, or alternatively, the notification may identify the one or more entries, associated with the other client information, that were removed from the memory.

Figure 6:
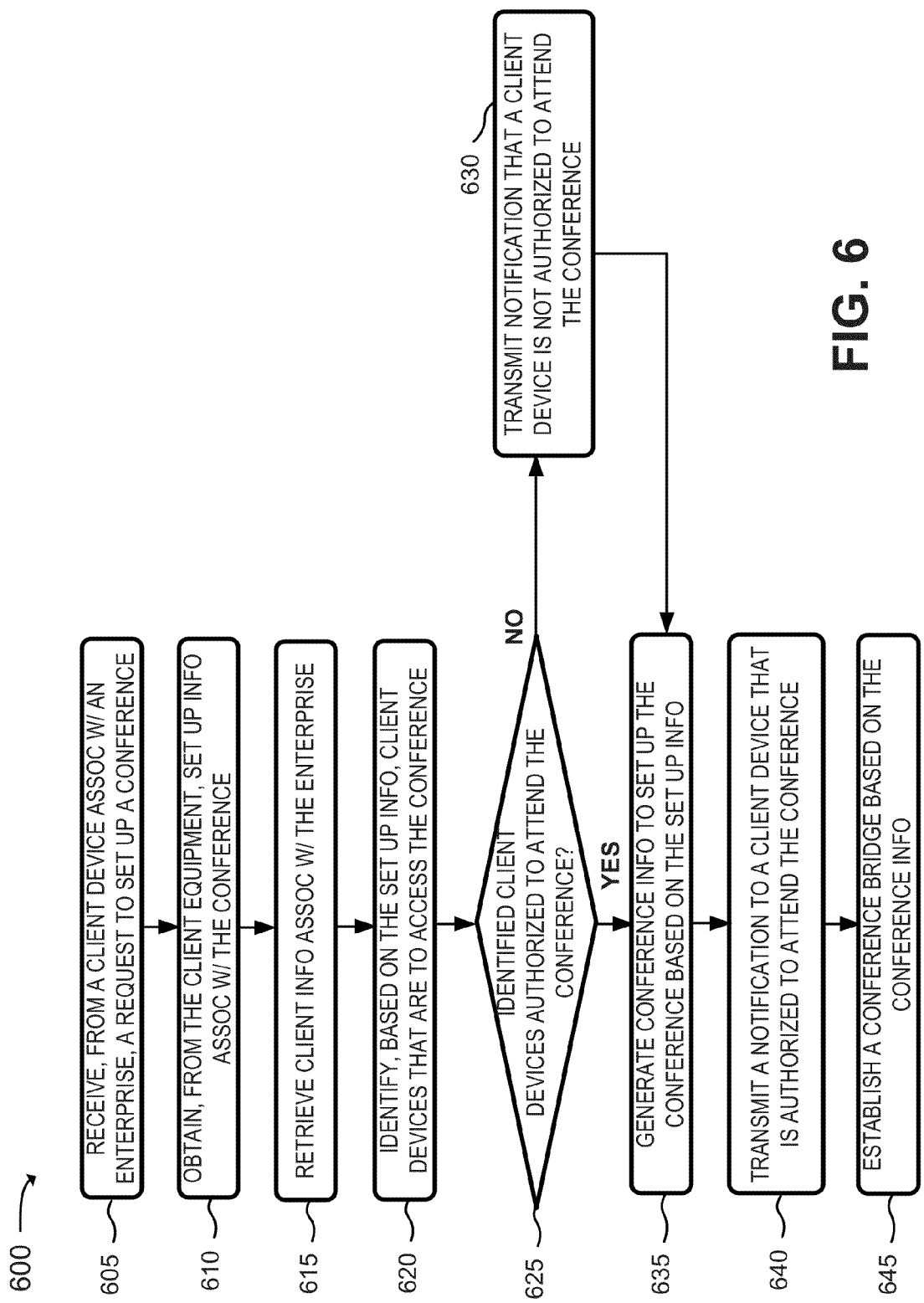
FIG. 6 is a flow chart of an example process for setting up a multi-party conference, according to an implementation described herein.

FIG. 6 is a flow chart of an example process 600 for setting up a multi-party conference, according to an implementation described herein. In one implementation, process 600 may be performed by VCCS 130. In another implementation, some or all of process 600 may be performed by a device or collection of devices separate from, or in combination with, VCCS 130.

As shown in FIG. 6, process 600 may include receiving, from a client device associated with an enterprise, a request to set up a conference (block 605) and obtaining, from the client device, set up information associated with the conference (block 610). For example, a user of client device 110 may access VCCS 130 to set up a video conference to be attended by one or more other client devices 110. In one example, client device 110 may access a website hosted by VCCS 130 and the user may enter, via a web page associated with the website, set up information associated with the conference. VCCS 130 may receive the set up information via the web page. In another example, client device 110 may communicate with client server 120 and the user may provide the set up information to client server 120 (e.g., via a user interface, etc.). Client server 120 may transmit the set up information to VCCS 130 and VCCS 130 may receive, from client server 120, the set up information.

The set up information may include information that identifies the user (e.g., a username, password, personal identification number, etc.), client device 110 (e.g., device identifier, MDN, IP address, MAC address, etc.), an enterprise with which client device 110 is associated (e.g., an enterprise name, identifier, etc.), client server 120 (e.g., a device identifier, IP address, MAC address, etc.), one or more other client devices 110 that are to attend the conference, one or more enterprises with which the other client devices 110 are associated, and/or one or more users of the other client devices 110. The set up information may also, or alternatively, identify a time period (e.g., a start time, an end time, an expected duration, etc.) during which the conference is to be held; features to be enabled during the conference, such as streaming video, streaming audio, generation of a video and/or audio recording of the conference, generation of a text transcript of the conference, applications to be used during the conference (e.g., a word processing application, a presentation application, etc.); and/or other set up information.

Process 600 may also include retrieving client information associated with the enterprise (block 615) and identifying, based on the set up information, client devices that are to access the conference (block 620). For example, VCCS 130 may retrieve, from a memory associated with VCCS 130 (e.g., from data structure 400 of FIG. 4), client information associated with the enterprise identified by the set up information. In another example implementation, VCCS 130 may communicate with client server 120, identified by the set up information, to obtain the client information. Additionally, or alternatively, VCCS 130 may, based on the set up information, identify each client device 110 that is permitted to access the conference.

If an identified client device is not authorized to attend the conference (block 625—NO), then process 600 may include transmitting a notification that the identified client device is not authorized to attend the conference (block 630). For example, VCCS 130 may determine whether client device 110, from which the set up information was received, is authorized to set up the conference by identifying whether a privilege level, specified by the client information and associated with the user of client device 110, is less than a threshold. Based on a determination that the privilege level is less than the threshold, VCCS 130 may transmit a notification, to client device 110, that the user is not authorized to set up the conference. If, however, VCCS 130 determines that the privilege level, associated with the user, is not less than the threshold, VCCS 130 may determine whether other client devices 110, identified by the set up information, are authorized to attend the conference based on the client information.

VCCS 130 may, for example, determine whether the client information, associated with client devices 110 identified by the set up information, authorizes the identified client device 110 to attend the conference. Based on a determination that the client information does not include an indication that the identified client device 110 is authorized to attend the conference, VCCS 130 may transmit a notification, to client device 110, indicating that the identified client device 110 is not authorized to attend the conference. In this example, VCCS 130 may determine that the identified client device 110 is not identified in a list of client devices 110 (e.g., a white list) that are authorized to attend a conference.

Additionally, or alternatively, the client information may indicate that identified client device 110 is not capable of communicating using an encryption scheme identified by the client information. Based on the indication that the identified client device 110 is not capable of communicating using the encryption scheme, VCCS 130 may not permit the identified client device 110 to attend the conference and/or may transmit a notification, to client device 110, indicating that the identified client device 110 is not authorized to attend the conference.

Additionally, or alternatively, based on a determination that the identified client device 110 is not authorized to attend the conference, VCCS 130 may transmit a notification, to client device 110, indicating that the identified client device 110 is not authorized to attend the conference. In this example, VCCS 130 may determine that the identified client device 110 is not authorized to attend the conference when the identified client device 110 is identified in a list (e.g., a black list) of client devices 110 that is not authorized to attend a conference and/or is associated with another enterprise that is not authorized to attend the conference.

Additionally, or alternatively, VCCS 130 may transmit the notification that the identified client device 110 is not authorized to attend the conference when VCCS 130 determines that a privilege level, associated with the user of client device 110, does not permit client device 110 to set up a conference with identified client device 110 associated with another enterprise and/or that is external to and/or not connected to a LAN/WAN associated with the enterprise.

If an identified client device is authorized to attend the conference (block 625-YES), then process 600 may include generating conference information to set up the conference based on the set up information (block 635). For example, VCCS 130 may determine that client device 110, from which the set up information was received, is authorized to set up the conference based on a determination that the privilege level, specified by the client information, is not less than the threshold and/or matches a particular level.

Additionally, or alternatively, VCCS 130 may determine that the identified client device 110 is authorized to attend the conference based on a determination that the identified client device 110 is identified in the list of client devices 110 (e.g., the white list) that are authorized to attend the conference.

Additionally, or alternatively, VCCS 130 may determine that the identified client device 110 is authorized to attend the conference based on a determination that the privilege level, associated with the user of client device 110, permits client device 110 to set up a conference with identified client devices 110 associated with another enterprise and/or that is external to and/or not connected to a LAN/WAN associated with the enterprise.

Additionally, or alternatively, VCCS 130 may determine that the identified client device 110 uses the encryption scheme identified by the client information and may permit the identified client device 110 to attend the conference based on the determination that identified client device 110 uses the encryption scheme.

Based on the determination that the user is authorized to set up the conference and/or that the identified client device 110 is authorized to attend the conference, VCCS 130 may generate conference information to be used to establish the conference. VCCS 130 may, for example, schedule the conference based on the time period identified by the set up information. Additionally, or alternatively, VCCS 130 may allocate resources for the scheduled conference based on a quantity of client devices 110 that are to attend the conference, such as bandwidth resources (e.g., for some or all client devices 110), ports via which client devices 110 are to access the conference, an address associated with the conference (e.g., an IP address, a URL, etc.), a telephone number associated with the conference, and/or access information with which to access the conference (e.g., login information, such as a username, password, PIN, etc.), etc.

VCCS 130 may also, or alternatively, obtain, from the client information, information associated with identified client device 110, such as a respective device identifier (e.g., an MDN, a LDN, etc.), a respective address (e.g., an IP address, a MAC address, etc.), information associated with a respective user of identified client device 110 (e.g., a username, password, PIN, etc.), information associated with an encryption scheme used by the identified client device 110, etc. VCCS 130 may also, or alternatively, obtain, from the client information, information associated with a particular client server 120 via which identified client device 110 is to access the conference (e.g., a device identifier, an address, etc.).

Process 600 may further include transmitting a notification to identified client devices that are authorized to attend the conference (block 640) and establishing a conference bridge based on the conference information (block 645). For example, VCCS 130 may transmit a notification to identified client devices 110 that are authorized to attend the conference. In one example, the notification may correspond to an invitation to attend the conference that identifies a time at which the conference is to start, a telephone number to be called to access the conference, a destination address (e.g., an IP address, a URL, etc.) to be used to communicate with VCCS 130 to attend the conference, etc. Additionally, or alternatively, the invitations may include login information (e.g., a username, a password, a PIN, etc.) to be used by the users of the identified client devices 110 to access the conference.

VCCS 130 may establish a conference bridge, associated with the conference, for the time period identified by the conference information. VCCS 130 may, for example, establish the conference bridge by allocating the bandwidth and/or assigning the ports, to the conference bridge, that were specified by the conference information. VCCS 130 may also, or alternatively, associate the telephone number, the destination address, and/or the login information to the conference bridge that allows the identified client devices 110 to access the conference bridge during the time period. VCCS 130 may allow each identified client device 110 to communicate with the conference bridge based on the telephone number and/or the destination address. VCCS 130 may also, or alternatively, establish a connection, via a respective port, between each identified client device 110 and the conference bridge, when the login information is received from each of the identified client devices 110 and/or is verified by VCCS 130. Establishing the connection to the conference bridge may permit each identified client device 110 to communicate with all or a portion of other identified client devices 110 that have established the connection to the conference bridge.

Figure 7:
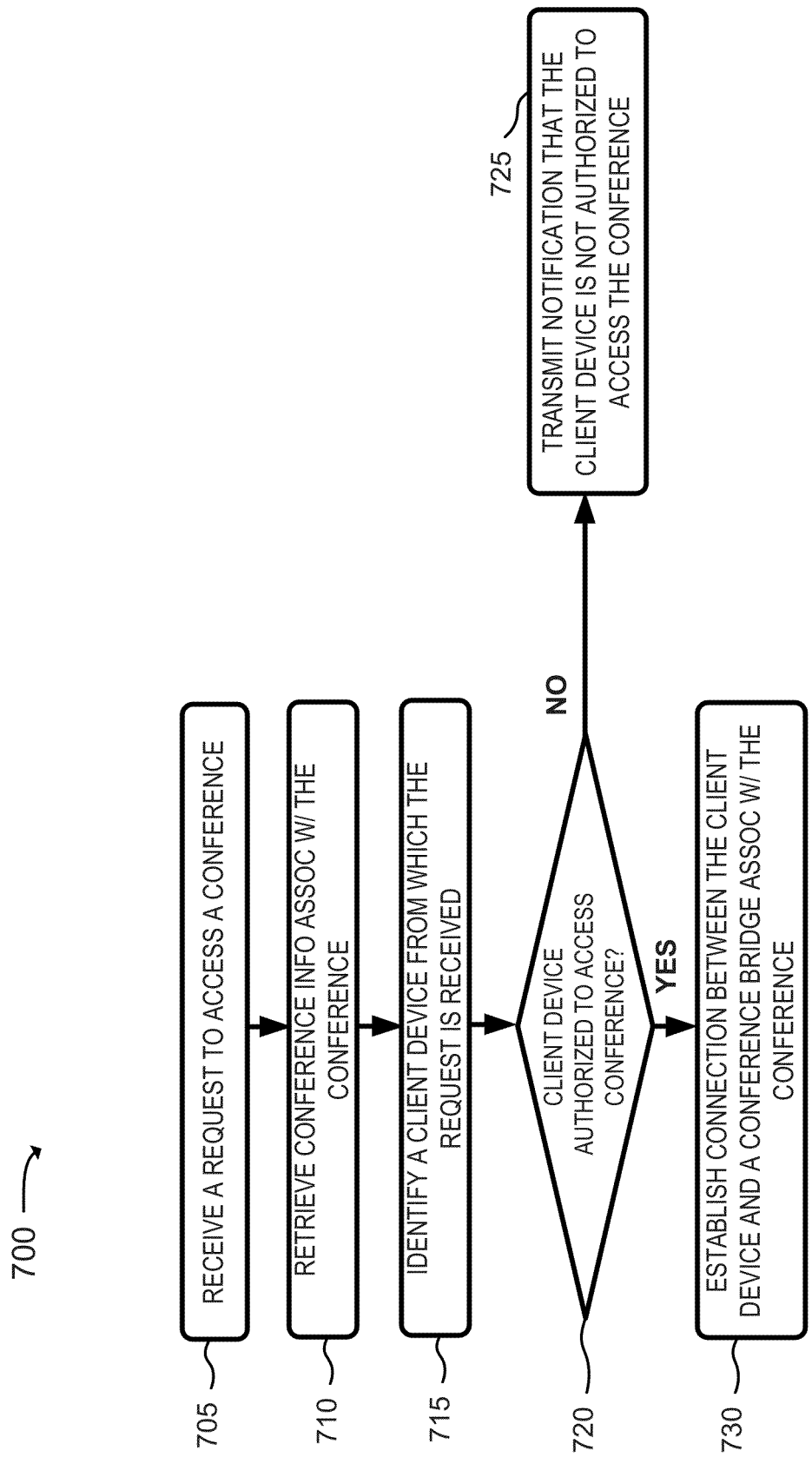
FIG. 7 is a flow chart of an example process for determining whether a user, of a client device, is authorized to access a conference.

FIG. 7 is a flow chart of an example process 700 for establishing a connection between a client device and a conference bridge. In one implementation, process 700 may be performed by VCCS 130. In another implementation, some or all of process 700 may be performed by a device or collection of devices separate from, or in combination with, VCCS 130.

As shown in FIG. 7, process 700 may include receiving a request to access a conference (block 705) and retrieving conference information associated with the conference (block 710). For example, a user, of client device 110, may cause client device 110 to transmit a request, to VCCS 130, to access a conference that was set up by VCCS 130 in a manner similar to that described above with respect to process 600 of FIG. 6. VCCS 130 may receive the request and may analyze one or more packets (e.g., packet headers, trailers, labels, payloads, etc.), associated with the request, to identify a conference bridge, associated with the conference, to be accessed by client device 110. In one example, VCCS 130 may obtain, from the packets, a destination address (e.g., a URL, an IP address, etc.), a telephone number, an identifier, etc. that corresponds to the conference bridge. VCCS 130 may, in response to the request, retrieve, from a memory associated with VCCS 130, conference information that corresponds to the conference identified by the request.

Process 700 may also include identifying the client device from which the request was received (block 715). For example, VCCS 130 may analyze one or more packets, associated with the request, to identify client device 110 from which the request was received. VCCS 130 may, for example, identify within the packets (e.g., within the packet header, trailer, label, payload, etc.), a source address (e.g., an IP address, a MAC address, a URI, etc.), information associated with a user (e.g., username, password, PIN, etc.), a device identifier (e.g., a MDN, a LDN, etc.), etc. associated with client device 110. Additionally, or alternatively, VCCS 130 may identify, from the packets, an address associated with client server 120 (e.g., an IP address, a URI, a MAC address, etc.) via which the request, from client device 110, was received. VCCS 130 may identify client device 110 based on the information, associated with client device 110, obtained from the packets.

If the client device is not authorized to access the conference (block 720—NO), then process 700 may include transmitting a notification that the client device is not authorized to access the conference (block 725). For example, VCCS 130 may determine whether client device 110 is authorized to access the conference based on the conference information and information obtained from the packets. In one example, VCCS 130 may determine that information associated with client device 110 (e.g., the source address) does not match any of the information associated with client device 110 included within the conference information. Based on a determination that the information, associated with the client device 110, does not match any information associated with client device 110 included within the conference information, VCCS 130 may transmit a notification, to client device 110, indicating that client device 110 is not authorized to attend the conference.

Additionally, or alternatively, VCCS 130 may determine that information that identifies the conference (e.g., a destination address, etc.), obtained from the packets, does not correspond to a conference bridge that client device 110 is authorized to attend. Based on the determination that the information that identifies the conference does not correspond to a conference bridge that client device 110 is authorized to attend, VCCS 130 may transmit a notification, to client device 110, indicating that client device 110 is not authorized to attend the conference.

Additionally, or alternatively, VCCS 130 may determine that login information (e.g., a username, password, PIN, etc.), associated with the request to access the conference, does not match login information, associated with the conference and identified within the conference information. Based on the determination that the login information does not match login information, associated with the conference and identified within the conference information, VCCS 130 may transmit a notification, to client device 110, indicating that client device 110 is not authorized to attend the conference.

If the client device is authorized to access the conference (block 720—YES), then process 700 may include establishing a connection between the client device and the conference bridge associated with the conference (block 730). For example, VCCS 130 may determine that information, associated with client device 110 (e.g., the source address), matches information, associated with client device 110, included within the conference information. Based on a determination that the information, associated with the client device 110, matches the information, associated with client device 110 included within the conference information, VCCS 130 may connect client device 110, via a port identified by the conference information, to a conference bridge associated with the destination address.

Additionally, or alternatively, VCCS 130 may determine that information that identifies the conference (e.g., based on the destination address, etc.) corresponds to the conference bridge that client device 110 is authorized to attend. Based on the determination that the information that identifies the conference corresponds to the conference bridge that client device 110 is authorized to attend, VCCS 130 may connect client device 110 to the conference bridge.

Additionally, or alternatively, VCCS 130 may determine that the login information matches login information, associated with the conference and identified within the conference information. Based on the determination that the login information matches the login information, associated with the conference and identified within the conference information, VCCS 130 may connect client device 110 to the conference bridge.

Figure 8:
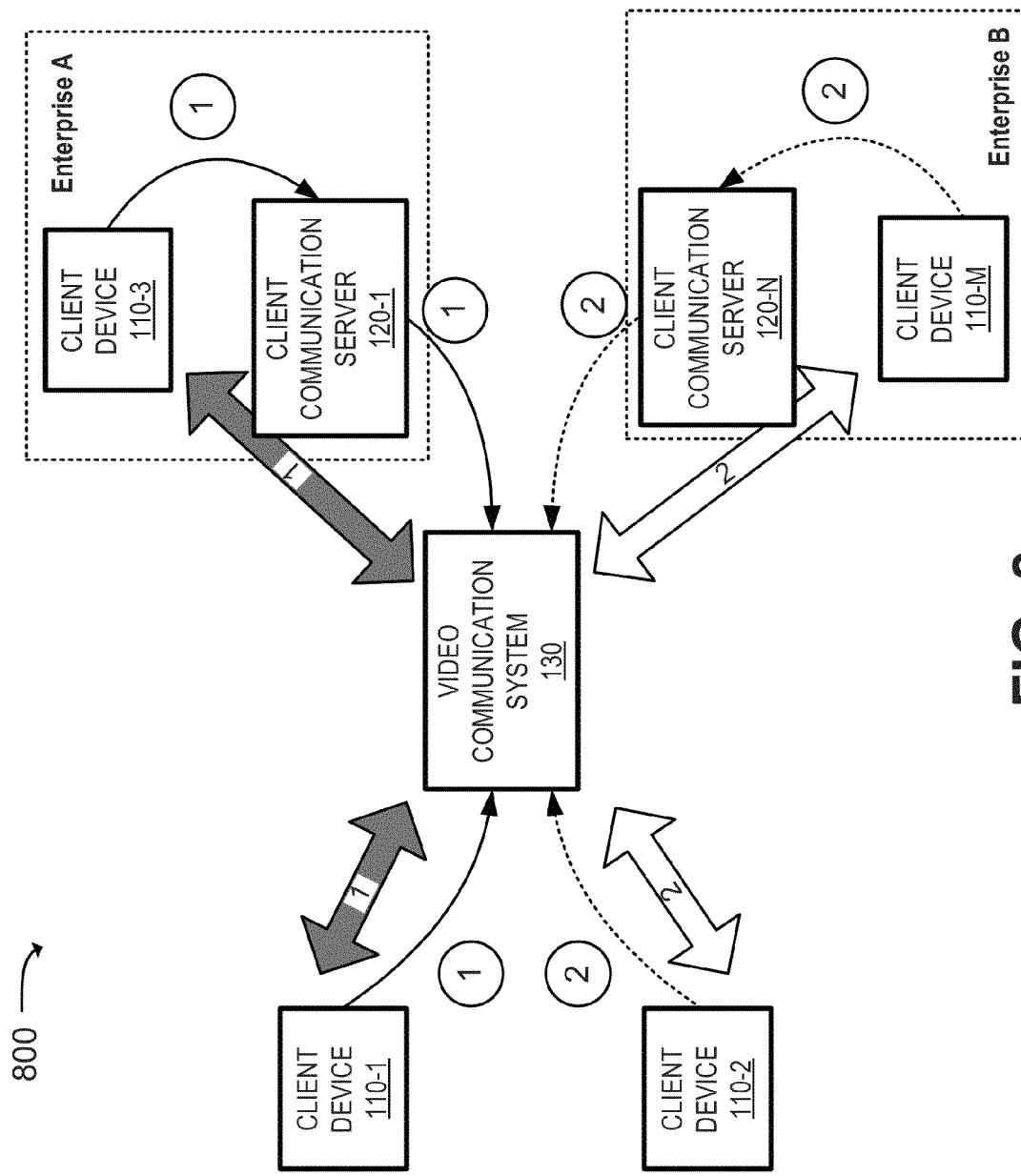
FIG. 8 is a diagram of example concurrent multi-tenant conferences within an example portion of the environment of FIG. 1.

FIG. 8 is a diagram of an example of concurrent conferences within an example portion 800 environment 100. As illustrated in FIG. 8, example environment portion 800 may include a group of client devices 110-1, 110-2, 110-3, and 110-M; client servers 120-1 and 120-N; and VCCS 130. Client devices 110-1, 110-2, 110-3, and 110-M; client servers 120-1 and 120-N; and VCCS 130 may include the features described above in connection with FIG. 1 and/or FIG. 2.

As shown in FIG. 8, example portion 800 represents concurrent conferences being hosted by VCCS 130. The concurrent conferences may include a first multi-party conference (e.g., represented by the circles labeled as "1") (hereinafter referred to as "first conference") between two or more client devices 110 (e.g., client device 110-1 and 110-3) and a second multi-party conference (e.g., represented by the circles labeled as "2") (hereinafter referred to as "second conference") between two or more other client devices 110 (e.g., client device 110-2 and 110-M).

Each of the concurrent conferences may be set up in a manner similar to that described above with respect to process 600 of FIG. 6. For example, VCCS 130 may establish the first conference based on first set up information, received from first client device 110 (e.g., first client device 110-3), and/or client information associated with a first enterprise (e.g., enterprise A), received from first client server 120 (e.g., first client server 120-1). Additionally, or alternatively, VCCS 130 may establish the second conference based on second set up information, received from second client device 110 (e.g., second client device 110-M), and/or client information associated with a second enterprise (e.g., enterprise B), received from second client server 120 (e.g., second client server 120-N). In this example, the first conference may be established for a first period of time that occurs during all or a portion of a second period of time during which the second conference is established.

First client device 110 may be associated with the first enterprise and may, in a manner similar to that described above with respect to process 700 of FIG. 7, access the first conference by communicating, via first client server 120, with VCCS 130 and/or providing login credentials (e.g., as shown by the left-pointing arrows labeled as "1") that permit VCCS 130 to connect first client device 110 to a first conference bridge associated with the first conference. Third client device 110 (e.g., third client device 110-1) may, in a manner similar to that described above with respect to process 700 of FIG. 7, access the first conference by communicating with VCCS 130 and/or providing login credentials (e.g., as shown by the right-pointing arrow labeled as "1") that permit VCCS 130 to connect third client device 110 to the first conference bridge.

Connecting first client device 110 and/or third client device 110 to the first conference bridge may permit first client device 110 and third client device 110 to communicate via the first conference bridge in a secure manner (e.g., as shown by shaded block arrows labeled as "1"). The shaded block arrows may represent secure connections (e.g., associated with a tunneling protocol, a virtual private network, etc.) that do not allow traffic, transmitted via the first conference bridge, to be received from and/or transmitted to client device 110 that is not connected, or authorized to be connected, to the first conference bridge. Additionally, or alternatively, information used to set up and/or establish the first conference (e.g., the set up information, the client information, and/or conference information) may be stored and/or handled, by VCCS 130, in a manner that does not allow the information used to set up and/or establish the first conference to be received from and/or transmitted to client device 110, that is not connected, or authorized to be connected, to the first conference bridge.

Second client device 110 may be associated with the second enterprise and may, in a manner similar to that described above with respect to process 700 of FIG. 7, access the second conference by communicating, via second client server 120, with VCCS 130 and/or providing login credentials (e.g., as shown by the left-pointing arrows labeled as "2") that permit VCCS 130 to connect second client device 110 to a second conference bridge associated with the second conference. Fourth client device 110 (e.g., fourth client device 110-2) may, in a manner similar to that described above with respect to process 700 of FIG. 7, access the second conference by communicating with VCCS 130 and/or providing login credentials (e.g., as shown by the right-pointing arrow labeled as "2") that permit VCCS 130 to connect fourth client device 110 to the second conference bridge.

Connecting second client device 110 and/or fourth client device 110 to the second conference bridge may permit second client device 110 and/or fourth client device 110 to communicate via the second conference bridge in a secure manner (e.g., as shown by block arrows labeled as "2"). The block arrows may, in a manner similar to that described above, represent secure connections that do not allow traffic, transmitted via the second conference bridge, to be received from and/or transmitted to client device 110 that is not connected, or authorized to be connected, to the second conference bridge. Additionally, or alternatively, information used to set up and/or establish the second conference may be stored and/or handled, by VCCS 130, in a manner that does not allow the information used to set up and/or establish the second conference to be received from and/or transmitted to client device 110, that is not connected, or authorized to be connected, to the second conference bridge.

Figure 9:
FIG. 9 is a flow chart of an example process for setting up a conference on a just-in-time basis.

FIG. 9 is a flow chart of an example process for setting up a conference on a just-in-time basis. In one implementation, process 900 may be performed by VCCS 130. In another implementation, some or all of process 900 may be performed by a device or collection of devices separate from, or in combination with, VCCS 130.

As shown in FIG. 9, process 900 may include receiving a request to set up a conference on a near real-time basis (block 905) and obtain set up information associated with the conference (block 910). For example, a user of client device 110 may access VCCS 130 to set up a video conference on a just-in-time basis. For example, setting up the video conference on the just-in-time basis may correspond to setting up the video conference on a near real-time basis and/or an on-the-fly basis as client devices 110 attempt to access the video conference. VCCS 130 may, for example and in response to the request, obtain set up information from client device 110. For example, VCCS 130 may, in a manner similar to that described above with respect to block 605 of FIG. 6, obtain set up information, associated with the just-in-time conference, from client device 110 via a web page (e.g., associated with a website hosted by VCCS 130), a user interface (e.g., via client server 120), etc.

The set up information may include information that identifies the user (e.g., a username, password, personal identification number, etc.), client device 110 (e.g., device identifier, MDN, IP address, MAC address, etc.), an enterprise with which client device 110 is associated (e.g., an enterprise name, identifier, etc.), client server 120 (e.g., a device identifier, IP address, MAC address, etc.), etc. The set up information may also, or alternatively, identify that the conference is to be established on a just-in-time basis; features to be enabled during the conference, such as streaming video, streaming audio, generation of a video and/or audio recording of the conference, generation of a text transcript of the conference, applications to be used during the conference (e.g., a word processing application, a presentation application, etc.); and/or other set up information.

Process 900 may also include establishing a conference bridge based on the set up information and client information associated with an enterprise (block 915) and connecting the client device to the conference bridge (block 920). For example, VCCS 130 may, based on the set up information, identify an enterprise with which client device 110 is associated. VCCS 130 may also, or alternatively, retrieve, from a memory associated with VCCS 130, client information associated with the enterprise.

VCCS 130 may, in a manner similar to that described above with respect to block 625 of FIG. 6, determine whether client device 110 is authorized to access a conference based on whether client device 110 is identified in a list of client devices 110, within the client information, that are approved to access a conference. Based on an indication that client device 110 is not identified in the list of client devices 110 that are approved to access a conference, VCCS 130 may not permit client information 110 to set up and/or access the just-in-time conference. In another example, VCCS 130 may permit client information 110 to set up and/or access the just-in-time conference based on an indication that client device 110 is identified in the list of client devices 110 that are approved to access a conference.

Additionally, or alternatively, VCCS 130 may, in a manner similar to that described above with respect to block 625 of FIG. 6, determine whether a user, of client device 110, is authorized to set up the just-in-time conference based on whether a privilege level, associated with the user and identified by the client information, is greater than a threshold. Based on a determination that the privilege level is less than the threshold and/or matches a particular level, VCCS 130 may not set up the just-in-time conference. In another example, VCCS 130 may determine that the user is authorized to set up the just-in-time conference based on a determination that the privilege level is not less than the threshold and/or matches a different particular level.

VCCS 130 may establish a conference bridge, associated with the just-in-time conference, based on the determination that the user is authorized to set up the just-in-time conference. VCCS 130 may, for example, allocate resources for the conference bridge, such as bandwidth resources for client device 110, a port via which client device 110 is to be connected to the conference bridge, an address associated with the conference (e.g., an IP address, a URL, etc.), a telephone number associated with the conference, and/or access information with which to access the conference (e.g., login information, such as a username, password, PIN, etc.), etc. VCCS 130 may connect client device 110 to the conference bridge via the port associated with the conference bridge.

Process 900 may further include receiving, from another client device, a request to access the conference (block 925) and verifying that the other client device is authorized to access the conference (block 930). For example, other client device 110 may transmit, to VCCS 130, a request to access the just-in-time conference. VCCS 130 may receive the request and may analyze one or more packets, associated with the request, to obtain information associated with the other client device 110. The information associated with other client device 110 may, for example, include a source address (e.g., an IP address, a MAC address, a URL, etc.), a device identifier (e.g., MDN, LDN, etc.), etc. VCCS 130 may also, or alternatively, analyze the packets to identify a destination address (e.g., a URL, URI, etc.) for the conference bridge associated with the just-in-time conference. The other client device 110 may, in one example, have receive the destination address, associated with the conference bridge, from VCCS 130 and/or client device 110 as a result of establishing the conference bridge.

VCCS 130 may determine whether the other client device 110 is identified (e.g., based on the source address, the device identifier, etc.) in the list of client devices 110, within the client information, that are authorized to attend a conference. Based on a determination that the other client device 110 is not identified within the list of client devices 110 that are authorized to access a conference, VCCS 130 may transmit a notification to other client device 110 indicating that the other client device 110 is not authorized to attend the just-in-time conference.

If, however, VCCS 130 determines that other client device 110 is identified within the list of client devices 110 that are authorized to access a conference, VCCS 130 may authorize the other client device 110 to access the conference bridge.

Process 900 may include allocating resources, to the conference bridge, for the other client device (block 935) and connecting the other client device 110 to the conference bridge (block 940). For example, based on the determination that the other client device 110 is authorized to access the just-in-time conference, VCCS 130 may allocate other resources to the conference bridge associated with the just-in-time conference. For example, VCCS 130 may allocate another port, to the conference bridge, via which other client device 110 is to be connected to the conference bridge. Additionally, or alternatively, VCCS 130 may allocate additional bandwidth and/or processing resources, to the conference bridge, to permit the other client device 110 to communicate via the conference bridge. Based on the allocation of the other resources to the conference bridge, VCCS 130 may establish a connection, via the other port, between the other client device 110 and the conference bridge.

In one example, VCCS 130 may determine, based on the client information, that the other client device 110 is a particular type of client device 110 (e.g., a CTS and/or some other type of client device 110) and/or is communicating via a particular type of client server 120 (e.g., a CUCM and/or some other type of client server). Based on the determination that the other client device 110 is the particular type of client device 110 and/or is communicating via the particular type of client server 120, VCCS 130 may retrieve, from a memory associated with VCCS 130, a signaling template. The signaling template may permit VCCS 130 to communicate with a variety of types of client devices 110 and/or client servers 120 using a variety of transport and/or signaling protocols (e.g., a streaming protocol, an IP, a TIP, etc.). VCCS 130 may use the signaling template to establish the connection between the other client device 110 and the conference bridge so that the other client device 110 is able to transmit traffic to and/or receive traffic from client device 110 via the conference bridge.

A system and/or method, described herein, may allow a VCCS, originally designed to enable a client device associated with an enterprise to hold video conferences, to set up and/or execute multiple distinct video conferences that can be accessed by client devices associated with multiple different enterprises. Each distinct video conference may allow users, of respective client devices, to interact in a secure manner and/or from potentially geographically distributed locations. The VCCS may establish each of the video conferences, using secure connections, based on respective client information that specifies access control, call routing, communication and/or security protocols, etc. for each of the video conferences. The VCCS may process information associated with video conferences so that information, associated with one video conference cannot be accessed via another video conference. Establishing multiple video conferences may enable the VCCS to provision a video conferencing service to client devices associated with multiple different enterprises, which may allow users, of the client devices, to hold meetings without the enterprises incurring the expense associated with users traveling to meetings or purchasing their own equipment.

A system and/or method may allow the VCCS to dynamically determine whether to permit a client device to access a virtual environment based on client information. The VCCS may, based on the client information, block a user from setting up a video conference that provides access to a user that is not authorized, by the client information, to access the video conference. A system and/or method may allow the VCCS to dynamically set up a video conference, on a just-in-time basis, if the client information permits the user to set up the video conference.

The foregoing description provides illustration and description, but is not intended to be exhaustive or to limit the implementations to the precise form disclosed. Modifications and variations are possible in light of the above disclosure or may be acquired from practice of the implementations.

While series of blocks have been described with regard to FIGS. 5-7 and 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a video communication system, a first request to set up a first video conference and a second request to set up a second video conference,
        the first request being received from a first client device, and
        the second request being received from a second client device;
    obtaining, by the video communication system and based on the first request and the second request, first client information associated with a first enterprise with which the first client device is associated and second client information associated with a second enterprise with which the second client device is associated,
        the first enterprise being different than the second enterprise;
    determining, by the video communication system, whether the first client information permits the first client device to set up the first video conference and whether the second client information permits the second client device to set up the second video conference;
    establishing, by the video communication system, the first video conference when the first client information permits the first client device to set up the first video conference,
        establishing the first video conference including:
            generating conference information, associated with the first video conference, based on a determination that the first client device is authorized to set up the first video conference; and
            establishing, based on the generated conference information, the first video conference; and
    establishing, by the video communication system, the second video conference when the second client information permits the second client device to set up the second video conference.

2. The method of claim 1, further comprising:
    receiving first traffic associated with the first video conference;
    receiving second traffic associated with the second video conference; and
    processing the first traffic or the second traffic in a manner that precludes the first traffic from being accessed via the second video conference and the second traffic from be accessed via the first video conference.

3. The method of claim 1, further comprising:
    obtaining, from the first client device, first set up information associated with the first video conference, where the first set up information identifies at least one of:
        the first enterprise, or
        a first set of client devices that are permitted to attend the first video conference; and
    obtaining, from the second client device, second set up information, associated with the second video conference, where the second set up information identifies at least one of:
        the second enterprise, or
        a second set of client devices that are permitted to attend the second video conference.

4. The method of claim 3, where obtaining the first client information and the second client information further includes:
    identifying the first enterprise based on the first set up information and the second enterprise based on the second set up information;
    retrieving, from a memory associated with the video communication system, the first client information based on the identification of the first enterprise; and
    retrieving, from the memory, the second client information based on the identification of the second enterprise.

5. The method of claim 3, further comprising:
    receiving, from one of the first set of client devices, a request to access the first video conference;
    determining whether the first client information permits the one of the first set of client devices to access the first video conference;
    permitting the one of the first set of client devices to access the first video conference when the first client information permits the one of the first set of client devices to access the first video conference; and
    precluding the one of the first set of client devices from accessing the first video conference when the first client information does not permit the one of the first set of client devices to access the first video conference.

6. The method of claim 3, further comprising:
    receiving, from one of the second set of client devices, a request to access the first video conference;
    determining whether the first client information permits the one of the second set of client devices to access the first video conference;
    permitting the one of the second set of client devices to access the first video conference when the first client information permits the one of the second set of client devices to access the first video conference; and
    precluding the one of the second set of client devices from accessing the first video conference when the first client information does not permit the one of the second set of client devices to access the first video conference.

7. The method of claim 1, where determining whether the first client information permits the first client device to set up the first video conference and whether the second client information permits the second client device to set up the second video conference includes:
 determining, based on the first client information, whether a first privilege level, associated with the first client device, matches a first level and whether a second privilege level, associated with the second client device, matches a second level;
 permitting the first client device to set up the first video conference when the first privilege level matches the first level;
 precluding the first client device from setting up the first video conference when the first privilege level does not match the first level;
 permitting the second client device to set up the second video conference when the second privilege level matches the second level; and
 precluding the second client device from setting up the second video conference when the second privilege level does not match the second level.

8. The method of claim 1,
where the conference information identifies at least one of:
 a conference bridge, associated with the first video conference, via which one or more client devices, invited to attend the first video conference, are to be connected,
 a time period during which the first video conference is to be held,
 an address associated with the conference bridge that allows the one or more client devices to access the conference bridge,
 one or more ports via which the one or more client devices are to be connected to the conference bridge,
 a quantity of bandwidth to be allocated to the conference bridge, or
 information that identifies the one or more client devices that are permitted to access the first video conference.

9. The method of claim 1, further comprising:
 identifying one or more client devices that are to attend the first video conference;
 determining that a client device, of the one or more client devices, is associated with an enterprise that is different than the first enterprise;
 determining whether the first client information permits the client device, associated with the enterprise that is different than the first enterprise, to access the first video conference;
 associating information associated with the client device with the conference information when the first client information permits the client device, associated with the enterprise that is different than the first enterprise, to access the first video conference; and
 transmitting a notification that the client device is not authorized to access the first video conference when the first client information does not permit the client device, associated with the enterprise that is different than the first enterprise, to access the first video conference.

10. The method of claim 1, further comprising:
 obtaining, from the first client device and based on the request, set up information, associated with the first video conference,
 the set up information including an indication that the first video conference is to be established on a just-in-time basis;
 associating first resources to a conference bridge associated with the first video conference based on a determination that the set up information includes the indication that the first video conference is to be established on the just-in-time basis, where the first resources include at least one of:
  a first quantity of bandwidth associated with the first client device, or
  a first port;
 connecting the first client device to the conference bridge via the first port;
 receiving, from a third client device, a request to access the first video conference;
 determining that the first client information permits the third client device to access the first video conference;
 associating second resources to the conference bridge based on the determination that the first client information permits the third client device to access the first video conference, where the second resources include at least one of:
  a second quantity of bandwidth associated with the third client device, or
  a second port; and
 connecting the third client device to the conference bridge via the second port.

11. The method of claim 1, further comprising:
 receiving an instruction to obtain the first client information associated with the first enterprise;
 communicating with a server device, associated with the first enterprise, to obtain the first client information, where the first client information includes at least one of:
  a first list of client devices that are authorized to access or set up a video conference associated with the first enterprise,
  a second list of client devices that are not authorized to access or set up a video conference associated with the first enterprise,
  a respective indication that identifies with which enterprise each of the client devices on the first list of client devices are associated, or
  information that allows each of the client devices on the first list of client devices or the second list of client devices to be identified; and
 storing, in a memory associated with the video communication system, the first client information.

12. A video communication system comprising:
a storage device to store client information, associated with an enterprise, that identifies one or more client devices that are authorized to access or set up a video conference; and
one or more devices to:
 receive, from a first client device, of the one or more client devices, a request to set up a video conference, the request identifying a second client device that is permitted to access the video conference,
 determine, based on the request, whether the client information authorizes the second client device to access the video conference,
 transmit a notification that the second client device is not permitted to access the video conference when the client information does not permit the second client device to access the video conference, generate conference information, associated with the video conference, when the client information permits the second client device to access the video conference, the conference information identifying resources to be allocated to establish a conference bridge for the video conference, establish the conference bridge based on the identified resources to be allocated to establish the conference bridge, where establishing the conference bridge causes the first client device to be connected to the conference bridge, receiving, from a client device, a request to access the video conference, connect the client device to the conference bridge based on a determination that the client device is the second client device, and transmit a notification that the client device cannot access the video conference based on a determination that the client device is not the second client device.

13. The system of claim 12, where
the client information includes a first list of client devices and a second list of client devices,
that first list of client devices identifies a first set of the one or more client devices that are authorized to set up or access the video conference,
the second list of client devices identifies a second set of the one or more client devices that are not authorized to set up or access the video conference, and
the one or more devices are further to:
determine that the second client device is not identified in the first list of client devices or is identified in the second list of client devices, and
transmit the notification that the second client device is not permitted to access the video conference based on the determination that the second client device is not identified in the first list of client devices or is identified in the second list of client devices.

14. The system of claim 12, where
the client information includes a first list of client devices and a second list of client devices,
that first list of client devices identifies a first set of the one or more client devices that are authorized to set up or access the video conference,
the second list of client devices identifies a second set of the one or more client devices that are not authorized to set up or access the video conference, and
the one or more devices are further to:
determine that the second client device is identified in the first list of client devices and is not identified in the second list of client devices, and
generate the conference information based on the determination that the second client device is identified in the first list of client devices and is not identified in the second list of client devices.

15. The system of claim 12, where the one or more devices are further to:
determine that the second client device is associated with another enterprise that is different than the enterprise,
transmit the notification that the second client device is not permitted to access the video conference when the client information does not permit a client device, associated with the other enterprise, to access the video conference, and
generate the conference information when the client information permits a client device, associated with the other enterprise, to access the video conference.

16. The system of claim 12, where the one or more devices area further to:
determine, based on the client information, that the second client device is a particular type of client device,
retrieve, from the storage device, a signaling template that corresponds to the particular type of client device, and
associate the signaling template with the conference information that allows traffic, being transported via the conference bridge, to be transmitted to or received from the second client device based on a transport or signaling protocol identified by the signaling template.

17. The system of claim 12, where the one or more devices are further to:
receive, from a third client device, a request to set up another video conference, and
establish, based on the request to set up the other video conference, another conference bridge associated with the other video conference,
where the other conference bridge or the conference bridge are established in a manner that precludes:
first traffic, associated with the video conference, from being accessed via the other video conference, and
second traffic, associated with the other video conference, from being access via the video conference.

18. The system of claim 12, where the one or more devices are further to:
identify, from the client information, a privilege level associated with the first client device,
determine whether the privilege level matches a particular level,
transmit a notification that the first client device is not authorized to set up the video conference when the privilege level does not match the particular threshold, and
determine whether the client information authorizes the second client device to access the video conference when the privilege level matches the particular threshold.

19. A device comprising:
a memory to store client information that identifies one or more devices that are permitted to set up or access a video conference; and
one or more processors to:
receive, from a first client device, a request to set up a video conference on a near real-time basis,
the request identifying a second client device to access the video conference,
determine, based on the request, whether the client information indicates that the first client device is authorized to set up the video conference,
establish a conference bridge, associated with the video conference, when the client information indicates that the first client device is authorized to set up the video conference,
associate first resources with the conference bridge that allows the first client device to be connected to or to communicate via the conference bridge,
connect the first client device to the conference bridge based on the association of the first resources with the conference bridge,
receive, from the second client device, a request to access the video conference,
determine whether the client information permits the second client device to access the video conference,
associate second resources with the conference bridge that allows the second client device to be connected to or to communicate via the conference bridge, connect the second client device to the conference bridge based on the association of the second resources with the conference bridge.

20. The device of claim 19, where the first resources identify at least one of:
   a first port,
   a first quantity of bandwidth associated with the first port, or
   a first protocol that is supported by the first client device,
   and where the second resources identify at least one of:
   a second port,
   a second quantity of bandwidth associated with the second port, or
   a second protocol that is supported by the second client device.

21. The device of claim 19, where, when establishing the conference bridge, the one or more processors are further to:
   establish a virtual environment via which the first client device can communicate with at least one client device, where the virtual environment uses a protocol that allows the first client device to communicate with the at least one client device in a secure manner, and
   transmit to the second client device, a network address associated with the virtual environment that allows the second client device to communicate with the first client device, via the virtual environment, in the secure manner.

22. The device of claim 21, where the one or more processors are further to:
   identify, from the request to access the video conference, a source address associated with the second client device and a destination address associated with a particular video conference,
   determine whether the client information includes the source address in a list of source addresses that correspond to the one or more client devices that are authorized to set up or access the video conference,
   determine whether the destination address matches the network address, associated with the virtual environment, when the source address is in the list of source addresses that correspond to the one or more client devices that are authorized to set up or access the video conference,
   connect the second client device to the conference bridge when the destination address matches the network address associated with the virtual environment, and
   transmit a notification that the second client device cannot be connected to the conference bridge when the source address is not in the list of source addresses that correspond to the one or more client devices or when the destination address does not match the network address associated with the virtual environment.

23. The device of claim 19, where the one or more processors are further to:
   receive, from a third client device, a request to set up another video conference, and
   establish, based on the request to set up the other video conference, another conference bridge, associated with the other video conference,
      where the other conference bridge or the conference bridge are established in a manner that precludes:
         first traffic, associated with the video conference, from being accessed via the other video conference, and
         second traffic, associated with the other video conference, from being access via the video conference.

24. The device of claim 19, where, when connecting the first client device to the conference bridge, the one or more processors are further to:
   establish a connection with the first client device using a protocol that precludes traffic, associated with video conference, from being transmitted to a client device that is connected to another conference bridge associated with another video conference.

\* \* \* \* \*